United States Patent
Malchow et al.

(10) Patent No.: US 10,924,034 B2
(45) Date of Patent: Feb. 16, 2021

(54) METHOD FOR CONTROLLING A CONVERTER, CONTROL DEVICE FOR A CONVERTER AND CONVERTER

(71) Applicant: Robert Bosch GmbH, Stuttgart (DE)

(72) Inventors: Florian Malchow, Stuttgart (DE); Michele Hirsch, Esslingen (DE); Tino Merkel, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/610,184

(22) PCT Filed: Apr. 25, 2018

(86) PCT No.: PCT/EP2018/060606
§ 371 (c)(1),
(2) Date: Nov. 1, 2019

(87) PCT Pub. No.: WO2018/202510
PCT Pub. Date: Nov. 8, 2018

(65) Prior Publication Data
US 2020/0076325 A1    Mar. 5, 2020

(30) Foreign Application Priority Data
May 2, 2017    (DE) .................. 10 2017 207 297

(51) Int. Cl.
*H02M 7/5395*    (2006.01)
*H02M 7/539*    (2006.01)
(Continued)

(52) U.S. Cl.
CPC ........... *H02M 7/5387* (2013.01); *B60L 3/003* (2013.01); *B60L 15/08* (2013.01); *B60L 50/60* (2019.02);
(Continued)

(58) Field of Classification Search
CPC ......... H02M 2001/0054; H02M 7/539; H02M 7/5395
(Continued)

(56) References Cited

U.S. PATENT DOCUMENTS

2007/0153890 A1*  7/2007  Huber ................ H02M 7/5395
                                                 375/238
2015/0016170 A1*  1/2015  Olarescu ............... H02M 7/00
                                                  363/132
(Continued)

FOREIGN PATENT DOCUMENTS

| DE | 102007018829 | 11/2008 |
| EP | 2833529 | 2/2015 |
| EP | 2940853 | 11/2015 |

OTHER PUBLICATIONS

International Search Report for Application No. PCT/EP2018/060606 dated Jul. 13, 2018 (English Translation, 2 pages).

*Primary Examiner* — Gary A Nash
(74) *Attorney, Agent, or Firm* — Michael Best & Friedrich LLP (57) ABSTRACT

The invention relates to the controlling of a rectifier with multiple electrical phases. In at least one electrical phase, the duty cycles are merged with one another in two consecutive cycles of the pulse-width modulated controlling, i.e. in a first PWM-pulse, the duty cycle is shifted to the end of the PWM-pulse, and in a subsequent PWM-pulse, the duty cycle is shifted to the start of the PWM-pulse. As a result, there must be no switching process between two consecutive PWM-pulses. In this way, the switching losses and consequently the rise in temperature of the rectifier can be minimised.

8 Claims, 4 Drawing Sheets

(51) Int. Cl.
  *H02M 7/5387* (2007.01)
  *H02P 6/15* (2016.01)
  *B60L 3/00* (2019.01)
  *B60L 15/08* (2006.01)
  *H02M 7/219* (2006.01)
  *B60L 50/60* (2019.01)
  *H02M 1/00* (2006.01)
  *H02M 1/32* (2007.01)

(52) U.S. Cl.
  CPC .............. *H02M 7/219* (2013.01); *H02P 6/15* (2016.02); *B60L 2210/40* (2013.01); *B60L 2240/427* (2013.01); *B60L 2240/525* (2013.01); *B60L 2240/526* (2013.01); *B60L 2240/80* (2013.01); *H02M 7/539* (2013.01); *H02M 7/5395* (2013.01); *H02M 2001/0054* (2013.01); *H02M 2001/327* (2013.01); *H02P 2209/095* (2013.01)

(58) Field of Classification Search
  USPC ...................................... 363/41, 95, 97, 137
  See application file for complete search history.

(56) References Cited

U.S. PATENT DOCUMENTS

| | | | | |
|---|---|---|---|---|
| 2015/0311800 | A1* | 10/2015 | Katayama | H02M 7/5395 323/235 |
| 2016/0111973 | A1* | 4/2016 | Deflorio | H02M 7/44 318/400.02 |

\* cited by examiner

METHOD FOR CONTROLLING A CONVERTER, CONTROL DEVICE FOR A CONVERTER AND CONVERTER

BACKGROUND OF THE INVENTION

The present invention relates to a method for controlling a converter, to a control device for a converter and to a converter. In particular, the present invention relates to the control of a converter for optimizing a temperature distribution in the converter.

The document DE 10 2007 018 829 A1 discloses a method and a device for controlling a power switch unit. In order to protect the power switch unit against thermal overload, a temperature benchmark of the power switch unit is ascertained, a temperature swing during an operating phase of the power switch unit is determined on the basis of the time profile of the temperature benchmark and then the power loss of the power switch unit is limited in such a way that the temperature swing does not exceed a predefined limit value.

In electrical drive systems, generally an electrical machine is fed with electrical energy by a converter connected upstream. Such converters comprise a plurality of semiconductor switching elements that can be used to set an electric current and/or an electrical voltage for the connected electrical machine. In this case, the switching elements are controlled by means of a pulse width modulation method, for example. Customary modulation methods are, for example, space vector modulation, sinusoidal modulation, flat top or flat bottom. Generally, all switching elements are controlled uniformly here in normal operation. During operation, consideration should be given here to ensuring that predefined limit values for the loading of the switching elements, such as, for example, a maximum temperature or the like, are not exceeded.

SUMMARY OF THE INVENTION

The present invention provides a method for controlling a converter, a control device for a pulse-width-modulated converter, and an electrical converter.

Accordingly, provision is made of:

A method for controlling a converter having a plurality of electrical phases. The method comprises a step for determining duty ratios for switched-on durations of pulses of pulse-width-modulated control of the electrical phases of a converter in a time frame. The time frame is formed by units of a PWM clock cycle of the pulse-width-modulated control. The method furthermore comprises a step for adapting the switching-on points in time and the switching-off points in time for the pulse-width-modulated control of the electrical phases. For a first electrical phase in a first PWM clock cycle the switched-on duration is shifted to the end of the first PWM clock cycle. In a second PWM clock cycle following the first PWM clock cycle, the switched-on duration of the first electrical phase is shifted to the beginning of the second PWM clock cycle, and wherein the duty ratios of the electrical phases correspond to the duty ratios determined.

Furthermore, provision is made of:

A control device for a pulse-width-modulated converter having a plurality of electrical phases. The control device comprises a control unit designed to determine duty ratios for switched-on durations of pulses for pulse-width-modulated control of the electrical phases of the converter in a time frame. The time frame is formed by units of a PWM clock cycle of the pulse-width-modulated control. Furthermore, the control unit is designed to set switching-on points in time and switching-off points in time for the pulse-width-modulated control of the electrical phases. For this purpose, for a first electrical phase in a first PWM clock cycle the switched-on duration is shifted to the end of the first PWM clock cycle and, in a second PWM clock cycle following the first PWM clock cycle, the switched-on duration of the first electrical phase is put at the beginning of the second PWM clock cycle, and wherein the duty ratios of the electrical phases correspond to the duty ratios determined.

Furthermore, provision is made of:

An electrical converter comprising a plurality of half-bridges and a control device according to the invention. Each of the half-bridges comprises in each case a first switching element and a second switching element. The control device is designed to control the first switching elements and the second switching elements of the half-bridges depending on control signals which have been set by the switching-on points in time and switching-off points in time set by the control device for the pulse-width-modulated control.

The present invention is based on the insight that switching processes of the switching elements in a converter are associated with switching losses. Said switching losses can result in heating of the switching elements and thus of the entire converter. If, on account of this heating, the temperature in the converter and in particular at the switching elements of the converter approaches a maximum operating temperature, or if said maximum operating temperature is exceeded, then the power of the converter must be decreased. Otherwise a further rise in temperature could result in premature aging or possibly even damage of the components, in particular of the switching elements in the converter.

The present invention is therefore based on the concept of taking account of this insight and reducing the switching losses and also the heating of the converter associated therewith. For this purpose, provision is made for controlling the switching elements of a converter with a switching pattern that reduces the switching losses. In particular, provision is made for adapting the switching-on points in time and the switching-off points in time of pulse-width-modulated control in such a way that the number of switching processes can be reduced at least in one electrical phase of a polyphase converter.

For such a reduction of the switching processes in an electrical phase of a polyphase converter, provision is made for linking together the switched-on durations for at least one phase in two successive clock cycles of the pulse-width-modulated control. For this purpose, by way of example, in a first clock cycle of the pulse-width-modulated control, the switched-on duration of the clock cycle can be put completely at the end of the clock cycle. In a succeeding clock cycle, the switched-on duration can be put completely at the beginning of the clock cycle. Consequently, no additional switching process need take place between these two successive clock cycles. In this way, during the two clock cycles in the corresponding phase, at least occasionally, the number of switching processes required is only half the number that would be required in the case of conventional control. Consequently, the switching losses also decrease and so does the energy associated therewith that is converted in the corresponding phase and results in heating of the converter. The temperature distribution of the individual phases in the converter can be optimized in this way.

As a result of the shifting of the switching-on and switching-off points in time, in an electrical phase two successive pulses thus "merge", while in the further electrical phases all the individual pulses occur as separate pulses. For an external observer this gives the impression that the phase having the "merged" pulses is operated with a reduced, in particular with a halved, clock frequency in comparison with the other electrical phases.

In this case, the term clock cycle or PWM clock cycle denotes the duration of a period of conventional pulse-width-modulated control. This is the period duration in which conventional pulse-width-modulated control is switched on and off once in each case. The linking according to the invention of two successive pulses in at least one of the electrical phases can be regarded here as a virtual doubling of the period duration and thus a halving of the switching frequency in the corresponding electrical phase. The term PWM clock cycle, relating to the period duration of underlying pulse-width-modulated control, has therefore been chosen in the present description. This is intended to avoid lack of clarity or possible confusion with a resulting (virtual) periodicity.

As a result of corresponding control, the converter will heat up to a lesser extent, and so a higher electrical power can be provided by the converter, without a maximum permissible operating temperature being exceeded.

In accordance with one embodiment, the first electrical phase in which the switched-on times are combined in two successive PWM clock cycles comprises the phase having the largest duty ratio. A particularly long continuous switched-on duration can be realized as a result.

In accordance with one embodiment, in the step for adapting the switching-on points in time and the switching-off points in time, the further electrical phases are switched on together with the first electrical phase in a first PWM clock cycle. Furthermore, the further electrical phases can be switched off together with the first electrical phase in a second PWM clock cycle. Particularly efficient control of the plurality of electrical phases of the converter can be realized in this way. In this case, the same voltage phasors can furthermore be used, wherein it is possible to achieve lower current ripple than is the case for switching-on and switching-off processes without synchronism.

In accordance with one embodiment, the method comprises a step for detecting a temperature and/or a temperature distribution in the converter. In this case, the adaptation of the switching-on points in time and the switching-off points in time can be carried out depending on the detected temperature and/or the detected temperature distribution. By taking account of the temperature and/or the temperature distribution in the converter, the adaptation of the switching-on points in time and the switching-off points in time can be adapted for a temperature distribution that is as homogeneous as possible in the converter.

In accordance with one embodiment, detecting the temperature and/or the temperature distribution comprises a sensor-based detection of at least one temperature in the converter. A simple and efficient detection of the temperature and/or the temperature distribution in the converter can be realized by means of a temperature sensor.

In accordance with one embodiment, detecting the temperature and/or the temperature distribution comprises a calculation of a temperature and/or a temperature distribution. By calculating the temperature and/or the temperature distribution in the converter, a simple and cost-effective determination of the temperature and/or the temperature distribution can be realized, without this requiring a relatively great outlay on hardware.

The above configurations and developments can, insofar as is practical, be combined with one another in any desired way. Further configurations, developments and implementations of the invention also encompass not explicitly mentioned combinations of features of the invention described above or below in relation to the exemplary embodiments. In particular, the person skilled in the art here will also add individual aspects as improvements and supplementations to the respective basic forms of the invention.

BRIEF DESCRIPTION OF THE DRAWINGS

The present invention is explained in greater detail below on the basis of the exemplary embodiments indicated in the schematic figures of the drawings, in which.

DETAILED DESCRIPTION

Figure 1:
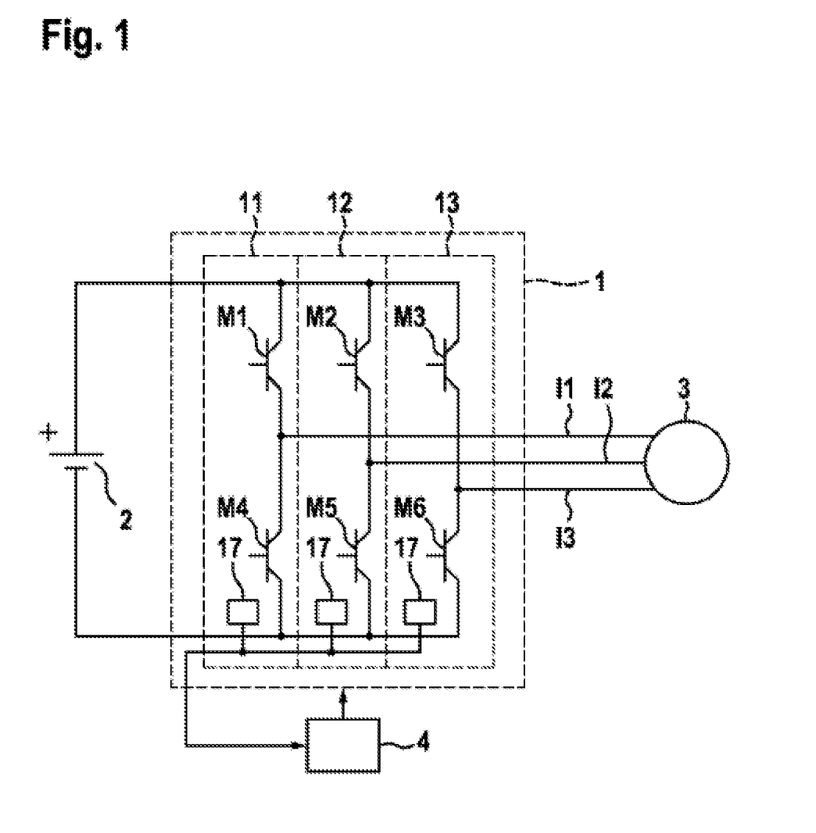
FIG. 1: shows a schematic illustration of an electrical drive system comprising a converter in accordance with one embodiment.

FIG. 1 shows a schematic illustration of an electrical drive system comprising a converter 1 in accordance with one embodiment. The converter is fed by an electrical energy source 2 on the input side. By way of example, said electrical energy source 2 can be a battery, in particular for example the traction battery of an electric or hybrid vehicle. On the output side, the converter is electrically coupled to an electrical machine 3. From the voltage provided on the input side, here a DC voltage, for example, the converter generates a polyphase AC voltage and provides the latter on the output side for the electrical machine 3. With the exemplary embodiment illustrated here and the rest of the description, the electrical machine 3 is controlled by means of a three-phase AC voltage. However, the present invention is not limited to a three-phase AC voltage. The converter 1 can furthermore also provide an arbitrary polyphase AC voltage, in particular an AC voltage having more than three phases, for controlling the electrical machine 3.

In this example, the converter 1 comprises three half-bridges 11, 12, 13 having in each case an upper switching element M1 to M3 and in each case a lower switching element M4 to M6. The switching elements M1 to M6 of the converter 1 are controlled here by a control device 4 by means of suitable control signals in order to generate the required polyphase output voltage from an input voltage. For this purpose, the individual switching elements M1 to M6 of the half-bridges 11 to 13 can be controlled for example by a control unit 15 of the control device 4 by means of pulse-width-modulated signals. In a conventional operating mode, the individual switching elements M1 to M6 of the half-bridges 11 to 13 are generally controlled uniformly here, such that a three-phase AC voltage is provided on the output side.

The individual components, in particular the switching elements M1 to M6, will heat up during the operation of the converter 1. In order to dissipate the heat that arises in this case, the converter 1 can dissipate the thermal energy from the switching elements M1 to M6 for example by way of a cooling device (not illustrated here). For this purpose, air or a cooling liquid can be used for example as cooling medium. While the cooling medium flows past the individual switching elements M1 to M6, the cooling medium heats up. By way of example, if the cooling medium flows firstly past the switching elements M1 and M4 of the first half-bridge 11 and then past the switching elements M2 and M5 of the second half-bridge and finally past the switching elements M3 and M6 of the third half-bridge, this can have the effect that the switching elements M1 and M4 of the first half-bridge 11 are cooled to a greater extent than the further switching elements M2, M3, M5 and M6. This can have the effect that the switching elements cooled to a lesser extent, in particular the switching elements M3 and M6 of the third half-bridge 13, heat up to a greater extent.

Figure 2:
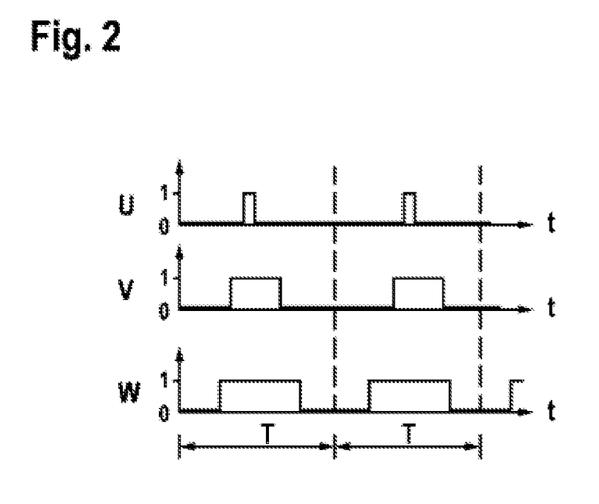
FIG. 2: shows a schematic illustration of the control signals of conventional pulse-width-modulated control of a converter.

FIG. 2 shows a schematic illustration of the control signals of conventional pulse-width-modulated control such as can form the basis of a converter described above, for example. For the control of the switching elements M1 to M6 of the half-bridges 11 to 13, the upper switching elements M1 to M3 can be controlled for example on the basis of the switching pattern illustrated here. The lower switching elements M4 to M6 of the half-bridges 11 to 13 can be controlled with corresponding complementary switching patterns. By way of example, a fixed period duration T can be predefined for pulse-width-modulated control of the individual switching elements M1 to M6. By way of example, a PWM clock cycle having a period duration T of 100 µs can be chosen as a time frame for the pulse-width-modulated control. However, other period durations are moreover possible as well. In the conventional example illustrated here, the switched-on times for each PWM clock cycle are arranged in a manner centered temporally in the middle within the time frame T. Consequently, firstly the phase W having the longest switched-on duration is switched on. Then the phase V having the middle switched-on duration is switched on and lastly the phase U having the shortest switched-on duration is switched on. Correspondingly, firstly the phase U having the shortest switched-on duration is switched off, then the phase V having the middle switched-on duration is switched off and finally the phase W having the longest switched-on duration is switched off. Consequently, one switching-on process and one switching-off process arise for each phase in each PWM clock cycle, wherein all the switching-on processes and switching-off processes take place at different points in time. Therefore, a total of six switching processes arise at different points in time, each of these processes being beset by switching losses.

Figure 3:
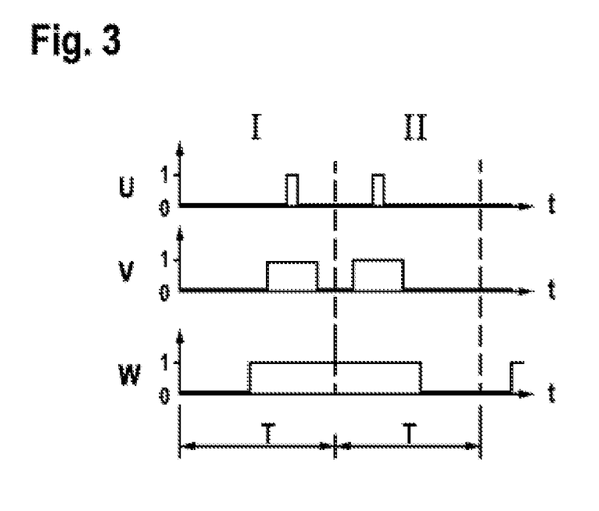
FIG. 3: shows a schematic illustration of the control signals of pulse-width-modulated control of a converter in accordance with one embodiment.

FIG. 3 shows a schematic illustration of the control signals of pulse-width-modulated control of a converter 1 in accordance with one embodiment of the present invention. As can be discerned here, the individual pulses for the corresponding switched-on times in the respective phases are shifted relative to conventional control. In particular, in this case, in at least one of the phases in two successive PWM clock cycles the switched-on times are shifted in such a way that the switched-on periods/switched-on durations of two successive PWM clock cycles "merge" with one another. In other words, in a first PWM clock cycle I the switched-on period is shifted completely to the end of the first PWM clock cycle I. In a second PWM clock cycle II following the first PWM clock cycle I, in the same phase the switched-on period is shifted completely to the beginning of the second PWM clock cycle II. This has the effect that no switching process for switching off and switching on again is required between the first PWM clock cycle I and the second PWM clock cycle II. It is thus merely necessary to carry out switching on once in the first PWM clock cycle I and to carry out switching off again only in the succeeding second PWM clock cycle II. This corresponds to control of the corresponding phase with half the clock frequency of conventional control.

In the exemplary embodiment in accordance with FIG. 3, the switched-on times and switched-off times of the phases U and V are shifted by the same time step as those of the phase W. Optionally, it is moreover also possible to carry out a shift of the switched-on times and/or the switched-off times for the further phases U and V of the converter 1. If the further phases were also correspondingly shifted in the same way, then this would correspond to a complete halving of the clock frequency for the pulse-width-modulated control.

Figure 4:
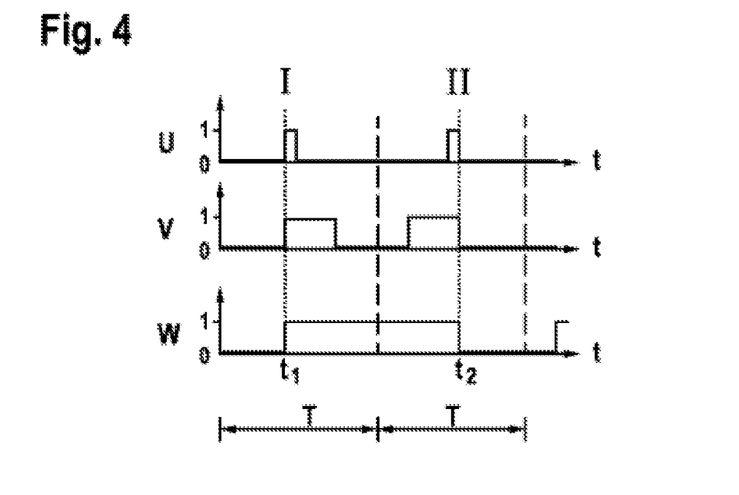
FIG. 4: shows a schematic illustration of the control signals of pulse-width-modulated control of a converter in accordance with a further embodiment.

Furthermore, it is also possible, however, to maintain the original clock frequency in the further phases U, V of the converter 1. In this case, by way of example, as illustrated in FIG. 4, a common point in time t1 can be chosen for switching on all the phases in the first PWM clock cycle I. If, as illustrated here, firstly all three phases are switched on jointly, thereafter firstly the phase U having the shortest switched-on time is switched off again. Then the phase V having the middle switched-on time is switched off. The switching-off point in time of the phase W having the longest switched-on time coincides with the end of the first PWM clock cycle I, and so switching off is not required here since, in the second PWM clock cycle II following the first PWM clock cycle I, the switched-on duration has been shifted completely to the beginning of the second PWM clock cycle II. Thereafter, in the further progression, the phase V having the middle switched-on duration is switched on and finally the phase U having the shortest switched-on duration is also switched on. Afterward, at the point in time t2, all three phases can be switched off jointly. After the end of this second PWM clock cycle II, once again a first PWM clock cycle I can follow, in which the control is effected as described above.

The example illustrated here, in which the phase W comprises the phase having the longest switched-on time, serves merely to afford a better understanding. It goes without saying that the present invention is correspondingly also applicable to control in which a different phase than the phase W has the longest switched-on time.

For relieving the burden of all phases, a shift of the switched-on times according to the method described above can be carried out alternately in each case, wherein in each case the phase having the longest switched-on duration is combined in two successive PWM clock cycles. For this purpose, by way of example, during an electrical period of the AC voltage to be output by the converter 1, successive PWM clock cycles can be combined in each case in the phase in which the longest switched-on time of a switching element M1 to M6 occurs.

Figure 5:
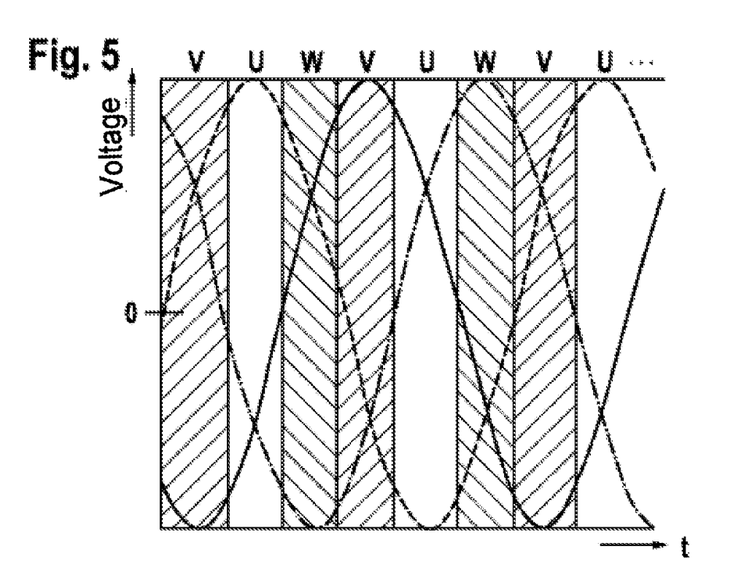
FIG. 5: shows a schematic illustration of a three-phase AC voltage such as can be provided by a converter in accordance with one embodiment.

FIG. 5 shows a schematic illustration of a three-phase AC voltage, in which the subranges having the longest switched-on time are in each case identified by vertical dashed lines. In the subranges without hatching, the longest switched-on time can be expected for the switching elements of the phase U. The subranges in which the phases V or W have the longest switched-on time are identified by corresponding hatching.

Alternatively, it is also possible to employ the combination of successive switched-on times only on a subrange of the time periods described above and to control the switching elements in a conventional manner in the remaining time periods, i.e. not to combine the switched-on times of successive clock cycles.

If, by way of example, by means of a temperature sensor (17) and/or a modeling of the thermal behavior of the converter 1, it is ascertained that a nonuniform temperature distribution is established in the converter 1, then it is also possible to apply the method described above only to that phase in which the highest heating has been ascertained. In this case, conventional control can also take place, if appropriate, in one or more further phases. In this way, a phase heated to a particularly great extent can be burdened to a lesser extent in order, if appropriate, to produce a more uniform temperature distribution in the converter 1. Moreover, it is also possible for further criteria such as, for example, calculated or sensor-detected aging of individual switching elements M1 to M6 or further criteria concomitantly to influence the selection of the control behavior of the individual switching elements M1 to M6.

Figure 6:
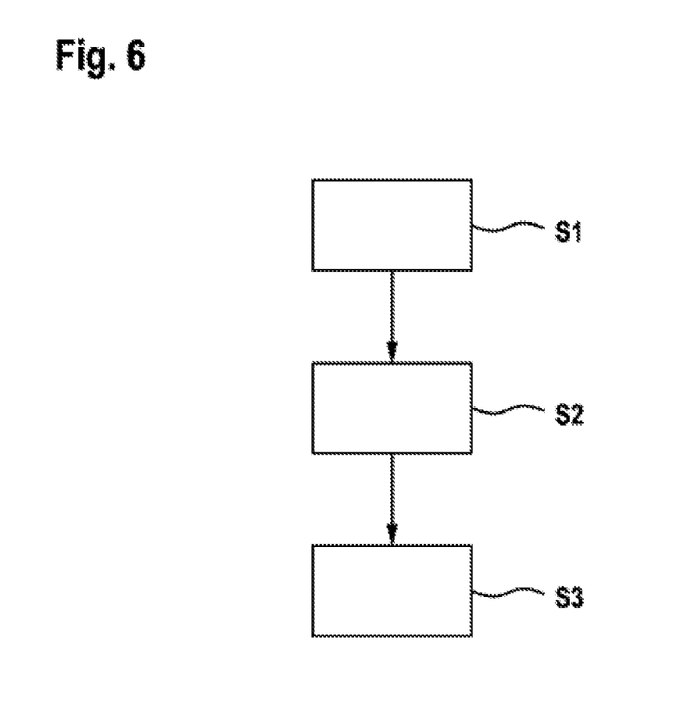
FIG. 6: shows a schematic illustration of a flow diagram such as forms the basis of a method for controlling a polyphase converter in accordance with one embodiment.

FIG. 6 shows a schematic illustration such as forms the basis of an above-described method for controlling a converter 1 having a plurality of electrical phases. Step S1 involves determining the duty ratios for pulse-width-modulated control of the phase of the converter 1 in a time frame. The time frame is formed by units of a PWM clock cycle of the pulse-width-modulated control. In FIGS. 2 to 4 described above, said time frame is predefined by the period duration T. The time frame can have a period duration of, for example, 100 µs or else any desired period duration deviating therefrom.

Step S2 involves adapting the switching-on points in time and the switching-off points in time for the pulse-width-modulated control of the phases. In particular, the adaptation can be effected in this case, as described above, in such a way that at least one electrical phase in two successive PWM clock cycles the switched-on times merge with one another. Besides the measures described here for combining the switched-on durations in two successive PWM clock cycles, supplementarily, if appropriate, further measures for relieving the burden of individual switching elements or individual half-bridges in the converter 1 are moreover also possible. In particular, it is also possible, if appropriate, to adapt the clock rates for the pulse-width-modulated control or to implement further measures for relieving the burden of individual switching elements or half-bridges.

To summarize, the present invention relates to the control of a converter having a plurality of electrical phases. In at least one electrical phase, in this case, in two successive cycles of the pulse-width-modulated control, the switched-on durations are merged with one another, that is to say that in a first PWM clock cycle the switched-on duration is shifted to the end of the PWM clock cycle and, in a succeeding PWM clock cycle, the switched-on duration is shifted to the beginning of the PWM clock cycle. Consequently, no switching process need take place between two successive PWM clock cycles. As a result, the switching losses and hence the heating of the converter can be minimized.

The invention claimed is:

1. A method for controlling a converter (1) having a plurality of electrical phases, comprising the following steps:
    determining (S1) duty ratios for switched-on durations of pulses for pulse-width-modulated control of the electrical phases of the converter (1) in a time frame, wherein the time frame is formed by units of a PWM clock cycle (I, II) of the pulse-width-modulated control; and
    adapting (S2) the switching-on points in time and switching-off points in time for the pulse-width-modulated control of the electrical phases, wherein for a first phase in a first PWM clock cycle (I) a switched-on duration is set completely at the end of the first PWM clock cycle (I) and, in a second PWM clock cycle (II) following the first PWM clock cycle (I), the switched-on duration of the first phase is set at the beginning of the second PWM clock cycle (II), wherein the first electrical phase of the converter (1) comprises an electrical phase having the largest duty ratio of the electrical phases of the converter (1), and wherein a conventional control switching takes place for one or more of the other electrical phases during the first PWM clock cycle and the second PWM clock cycle, and wherein the duty ratios of the electrical phases correspond to the duty ratios determined.

2. The method as claimed in claim 1, wherein in step (S2) for adapting the switching-on points in time and switching-off points in time, the further electrical phases of the converter (1) are switched on together with the first electrical phase in the first PWM clock cycle (I) and the further electrical phases are switched off together with the first electrical phase in the second PWM clock cycle (II).

3. The method as claimed in claim 1, comprising a step for detecting a temperature and/or a temperature distribution in the converter (1);
    wherein step (S2) for adapting the switching-on points in time and the switching-off points in time is carried out depending on the detected temperature and/or a temperature distribution.

4. The method as claimed in claim 3, wherein detecting the temperature and/or the temperature distribution comprises a sensor-based detection of at least one temperature in the converter (1).

5. The method as claimed in claim 3, wherein detecting the temperature and/or the temperature distribution comprises a calculation of a temperature and/or a temperature distribution.

6. The method as claimed in claim 1, comprising a step (S3) for controlling the converter (1) depending on the adapted switching-on points in time and switching-off points in time for the pulse-width-modulated control of the electrical phases of the converter (1).

7. A control device (4) for a pulse-width-modulated converter (1) having a plurality of electrical phases, comprising:
    a control unit designed to determine duty ratios for switched-on durations of pulses of pulse-width-modulated control of the electrical phases of the converter (1) in a time frame, wherein the time frame is formed by units of a PWM clock cycle (I, II) of the pulse-width-modulated control, and the control unit is designed to set switching-on points in time and switching-off points in time for the pulse-width-modulated control of the electrical phases, wherein for a first electrical phase in a first PWM clock cycle (I) the switched-on duration is set completely at the end of the first PWM clock cycle and, in a second PWM clock cycle (II) following the first PWM clock cycle (I), the switched-on duration of the first electrical phase is set at the beginning of the second PWM clock cycle (II), wherein the first electrical phase of the converter (1) comprises an electrical phase having the largest duty ratio of the electrical phases of the converter (1), and wherein a conventional control switching takes place for one or more of the other electrical phases during the first PWM clock cycle and the second PWM clock cycle, and wherein the duty ratios of the electrical phases correspond to the duty ratios determined.

8. An electrical converter (1), comprising:

a plurality of half-bridges (11, 12, 13) each comprising a first switching element (M1, M2, M3) and a second switching element (M4, M5, M6); and a control device (4) as claimed in claim 7, wherein the control device (4) is designed to control the first switching elements (M1, M2, M3) and the second switching elements (M4, M5, M6) of the half-bridges (11, 12, 13) depending on the set switching-on points in time and the set switching-off points in time.

* * * * *